(12) United States Patent
Xu et al.

(10) Patent No.: US 7,930,567 B2
(45) Date of Patent: Apr. 19, 2011

(54) KEYBOARD

(75) Inventors: Fa-Qing Xu, Shenzhen (CN); Gui-Rong Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 597 days.

(21) Appl. No.: 12/056,243

(22) Filed: Mar. 26, 2008

(65) Prior Publication Data
US 2009/0183012 A1 Jul. 16, 2009

(30) Foreign Application Priority Data

Jan. 16, 2008 (CN) .......................... 2008 1 0300120

(51) Int. Cl.
*G06F 1/26* (2006.01)

(52) U.S. Cl. ........................................ 713/300; 713/310
(58) Field of Classification Search ........................ None
See application file for complete search history.

(56) References Cited

U.S. PATENT DOCUMENTS 5,935,254 A * 8/1999 Lee ................................. 713/340
6,272,645 B1 * 8/2001 Wang ............................. 713/323

FOREIGN PATENT DOCUMENTS

CN 2901406 Y 5/2007

* cited by examiner

*Primary Examiner* — Dennis M Butler
(74) *Attorney, Agent, or Firm* — Frank R. Niranjan

(57) ABSTRACT

A keyboard includes a keyboard processor configured for outputting a control signal for turning a computer on/off; a switch circuit connected to a turn-on port of a south bridge chipset on a mainboard of the computer; and a processor connected to the keyboard processor and the switch circuit. When the processor receives the control signal output from the keyboard processor, the processor outputs a high pulse signal to the switch circuit to make the turn-on port grounded to turn on or turn off the computer.

7 Claims, 1 Drawing Sheet

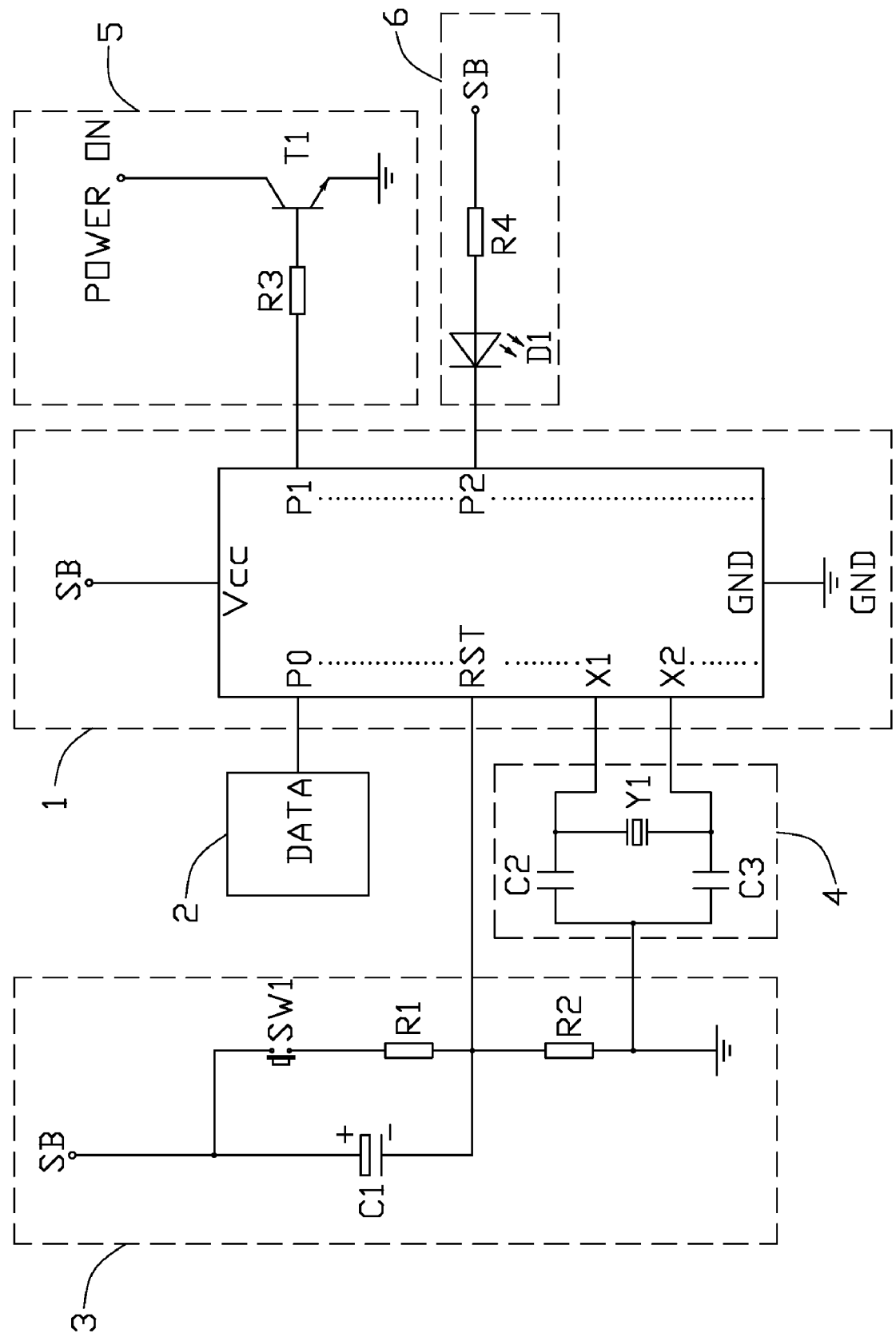

KEYBOARD

BACKGROUND

1. Field of the Invention

The present invention relates to keyboards, and particularly to a keyboard which can turn a computer on/off.

2. Description of Related Art

A contemporary keyboard as an input device has very simple functions. The designers often focus their mind on improving keys of the keyboard other than finding other uses for the keyboard.

What is needed, therefore, is a keyboard which has functions other than just data input.

SUMMARY

An embodiment of a keyboard includes a keyboard processor configured for outputting a control signal for turning a computer on/off; a switch circuit connected to a turn-on port of a south bridge chipset on a mainboard of the computer; and a processor connected to the keyboard processor and the switch circuit. When the processor receives the control signal output from the keyboard processor, the processor outputs a high pulse signal to the switch circuit to make the turn-on port grounded to turn on or turn off the computer.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a keyboard in accordance with an embodiment of the present invention.

DETAILED DESCRIPTION

Referring to the drawing, a keyboard in accordance with an embodiment of the present invention includes a processor 1, a keyboard processor 2, a reset circuit 3, a clock circuit 4, a switch circuit 5, and an indication circuit 6.

The processor 1 includes a power pin Vcc, a ground pin CND, two clock pins X1 and X2, a reset pin RST, an input P0, and two output pins P1, P2. The power pin Vcc of the processor 1 is connected to a standby power supply 5V_SB, the ground pin GND of the processor 1 is grounded, the reset pin RST of the processor 1 is connected to the reset circuit 3, the clock pins X1 and X2 of the processor 1 are connected to the clock circuit 4, the input pin P0 of the processor 1 is connected to the keyboard processor 2, the output pin P1 of the processor 1 is connected to the switch circuit 5, and the output pin P2 of the processor 1 is connected the indication circuit 6. In this embodiment, the processor 1 is an 8051 single chip.

The keyboard processor 2 includes a data pin DATA, the data pin DATA is connected to the input pin P0 of the processor 1.

The reset circuit 3 includes an electrolytic capacitor C1, a reset switch SW1, and two resistors R1 and R2. The anode of the electrolytic capacitor C1 is connected to the standby power supply 5V_SB, the cathode of the electrolytic capacitor C1 is connected to the reset pin RST of the processor 1. One end of the reset switch SW1 is connected to the standby power supply 5V_SB, the other end of the reset switch SW1 is connected to one end of the resistor R1, the other end of the resistor R1 is connected to the reset pin RST of the processor 1. One end of the resistor R2 is connected to the reset pin RST of the processor 1, and the other end of the resistor R2 is grounded. When the computer freezes or hangs, the reset switch SW1 is closed to reset the processor 1. The electrolytic capacitor C1 is configured to filter noise and make the standby power supply SB_5V to provide a steady reset voltage for the processor 1.

The clock circuit 4 includes a crystal vibrator Y1 and two capacitors C2 and C3. Two ends of the crystal vibrator Y1 are respectively connected to the clock pins X1 and X2 of the processor 1. One end of the capacitor C2 is connected to the clock pin X1 of the processor 1, and the other end of the capacitor C2 is grounded. One end of the capacitor C3 is connected to the clock pin X2 of the processor 1, and the other end of the capacitor C3 is grounded.

The switch circuit 5 includes a resistor R3 and a transistor T1. One end of the resistor R3 is connected to the output pin P1 of the processor 1, the other end of the resistor R3 is connected to the base of the transistor T1, the collector of the transistor T1 is connected to a turn-on port POWER ON of a south bridge chipset on a mainboard, the emitter of the transistor T1 is grounded. When the turn-on port POWER ON receives a low level voltage, the motherboard is powered up/off. In this embodiment, the transistor T1 is an NPN transistor.

The indication circuit 6 includes a light-emitting diode (LED) D1 and a resistor R4. The cathode of the LED D1 is connected to the output pin P2 of the processor 1, the anode of the LED D1 is connected to one end of the resistor R4, and the other end of the resistor R4 is connected to the standby power supply 5V_SB.

When the computer is turned off and the standby power supply 5V_SB is provided, NUM/LOCK key on the keyboard is deactivated, a turn-on/turn-off key which is set in a program of the processor 1 is pressed down. In this embodiment, the turn-on/turn-off key is set as the figure key 5. The data pin DATA of the keyboard processor 2 outputs a high pulse signal to the processor 1 via the input pin P0 of the processor 1, the output pin P1 of the processor 1 outputs a high pulse signal to the switch circuit 5 to make the transistor T1 turn on, the turn-on port POWER ON is grounded, and the computer turns on. Meanwhile, the voltage at the output pin P2 of the processor 1 is pulled down, and the LED D1 turns on and emits light for a moment to indicate that the computer is turned on normally.

When the computer is turned on and the NUM/LOCK key is deactivated, the figure key 5 is pressed. The data pin DATA of the keyboard processor 2 outputs a high pulse to the processor 1 via the input pin P0 of the processor 1, and then the output pin P1 of the processor 1 outputs a high pulse signal to the switch circuit 5 to turn on the transistor T1, the turn-on port POWER ON is grounded, and the computer turns off. Meanwhile, the voltage at the output pin P2 of the processor 1 is pulled down and the LED D1 turns on and glitters for a moment to indicate that the computer is turned off normally.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A keyboard comprising:
   a keyboard processor configured for outputting a control signal for turning a computer on/off;
   a switch circuit connected to a turn-on port of a south bridge chipset on a mainboard of the computer; and
   a processor connected to the keyboard processor and the switch circuit, when the processor receives the control signal output from the keyboard processor, the processor outputs a high pulse signal to the switch circuit to make the turn-on port grounded to turn on or turn off the computer.

2. The keyboard as claimed in claim 1, wherein the keyboard further comprises a reset circuit, the reset circuit comprises a first capacitor, a reset switch, a first resistor and a second resistor, the anode of the first capacitor is connected to a standby power supply, the cathode of the first capacitor is connected to a reset pin of the processor, one end of the reset switch is connected to the standby power supply, the other end of the reset switch is connected to one end of the first resistor, the other end of the first resistor is connected to the reset pin of the processor, one end of the second resistor is connected to the reset pin of the processor, and the other end of the second resistor is grounded.

3. The keyboard as claimed in claim 2, wherein the first capacitor is an electrolytic capacitor.

4. The keyboard as claimed in claim 1, wherein the processor comprises a power pin, a ground pin, a first clock pin, a second clock pin, a reset pin, an input pin, and a first output pin, the power pin of the processor is connected to a standby power supply, the ground pin of the processor is grounded, the reset pin of the processor is connected to a reset circuit, the first clock pin and the second clock pin of the processor are all connected to a clock circuit, the input pin of the processor is connected to a data pin of the keyboard processor, the first output pin of the processor is connected to the switch circuit.

5. The keyboard as claimed in claim 4, wherein the clock circuit comprises a crystal vibrator, a second capacitor and a third capacitor, two ends of the crystal vibrator are respectively connected to the first clock pin and the second clock pin of the processor, one end of the second capacitor is connected to the first clock pin of the processor, the other end of the second capacitor is grounded, one end of the third capacitor is connected to the second clock pin of the processor, and the other end of the third capacitor is grounded.

6. The keyboard as claimed in claim 4, wherein the switch circuit comprises a third resistor and a transistor, the transistor is an NPN transistor, one end of the third resistor is connected to the first output pin of the processor, the other end of the third resistor is connected to the base of the NPN transistor, the collector of the NPN transistor is connected to the turn-on port of the bridge chipset on the mainboard, the emitter of the NPN transistor is grounded.

7. The keyboard as claimed in claim 4, wherein the keyboard further comprises an indication circuit, the indication circuit comprises a light-emitting diode (LED) and a fourth resistor, the cathode of the LED is connected to a second output pin of the processor, the anode of the LED is connected to the standby power supply via the fourth resistor.

* * * * *